Figure 1:
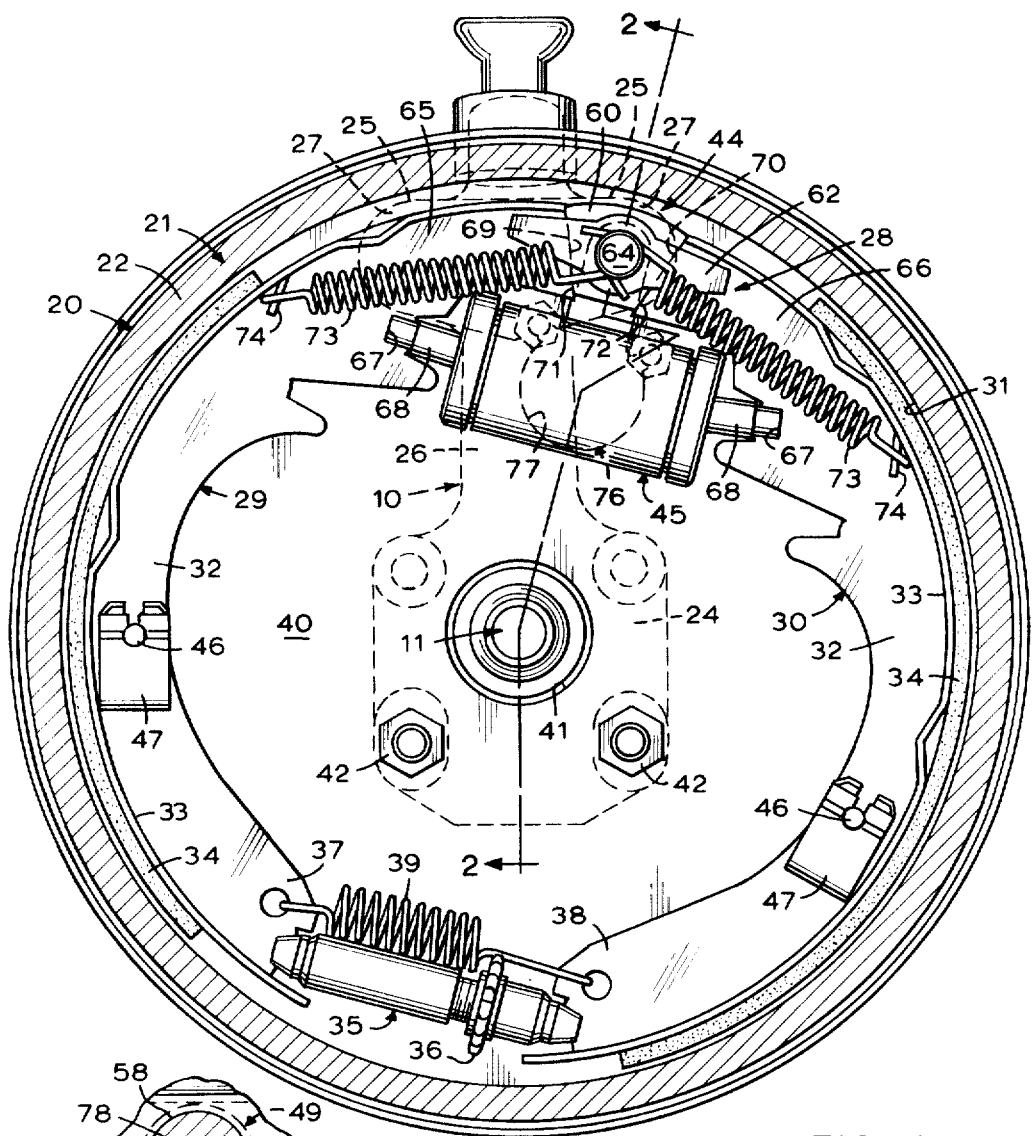

Jan. 31, 1967  G. E. BORGARD  3,301,355
BRAKE SUPPORT ASSEMBLY

Filed July 31, 1964  2 Sheets-Sheet 1

INVENTOR
GLENN E. BORGARD
BY
Gravely, Lieder & Woodruff
ATTORNEYS

INVENTOR
GLENN E. BORGARD
BY
Gravely, Lieder & Woodruff
ATTORNEYS

United States Patent Office 3,301,355
Patented Jan. 31, 1967

3,301,355
BRAKE SUPPORT ASSEMBLY
Glenn E. Borgard, Overland, Mo., assignor to Wagner Electric Corporation, St. Louis, Mo., a corporation of Delaware
Filed July 31, 1964, Ser. No. 386,622
10 Claims. (Cl. 188—206)

This invention relates generally to the friction device art and more particularly to the mounting structure for the brake assembly of a vehicle.

In conventional shoe brake structures, both the wheel cylinder and anchor pin are fastened to the backing plate which in turn is rigidly secured to the steering knuckle at the spindle location thereof whereby the brake torque is transmitted through the anchor pin and backing plate to the steering knuckle. It has been proposed that the anchor pin be fastened rigidly to an embossment of the steering knuckle to provide for transmitting the brake torque directly through the anchor pin to the steering knuckle.

One of the most critical problems of brake shoe assembly design is maintaining the concentricity of pivoted brake shoes with the brake drum during non-braking periods to assure that there is no brake shoe drag and resulting wear. An aspect of the problem is the close tolerance required in the radial dimension between the spindle and anchor pin center lines. One proposal to obviate this aspect of the problem has been to adjust the anchor pin on the backing plate by use of cam means or the like, but this solution has not proved to be satisfactory. Another aspect of the problem encountered in the piror art is the necessity of securing the backing plate in a rigid, non-distorted position on the steering knuckle, strength and rigidity of the backing plate being essential since the backing plate carries the brake torque and non-distortion also being essential since brake shoe movement would be adversely affected otherwise. In fact, the problem of distortion of the backing plate became even more pronounced in securing the anchor pin directly to the steering knuckle because of the close tolerance requirements for machining the backing plate mounting positions at the radially spaced and axially offset spindle pad and the knuckle pad locations.

The principal object of the present invention is to provide an improved knuckle mounted brake assembly obviating the problems of the prior art.

Another object is to provide a simplified brake assembly in which the brake shoes are self-centering with respect to the brake drum and the brake torque is transmitted directly to the steering knuckle.

A further object of the invention is to provide a brake sub-assembly which can be assembled, shipped and installed as a unit thereby greatly facilitating replacement and service of vehicle brakes.

These and still other objects and advantages will become more apparent hereinafter.

Briefly, the invention is embodied in a brake assembly mounting including a support member, an anchor pin secured to the support member and seating opposed ends of brake shoes, means yieldably holding the brake shoes in assembled articulated position and permitting centering movement thereof on the anchor pin and relative to the brake drum, and means for mounting the wheel cylinder and anchor pin in predetermined spaced relation.

Figure 3:
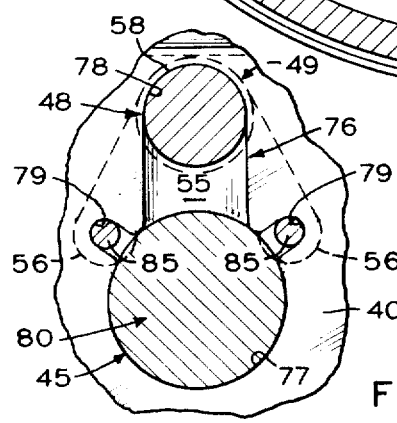
Figure 2:
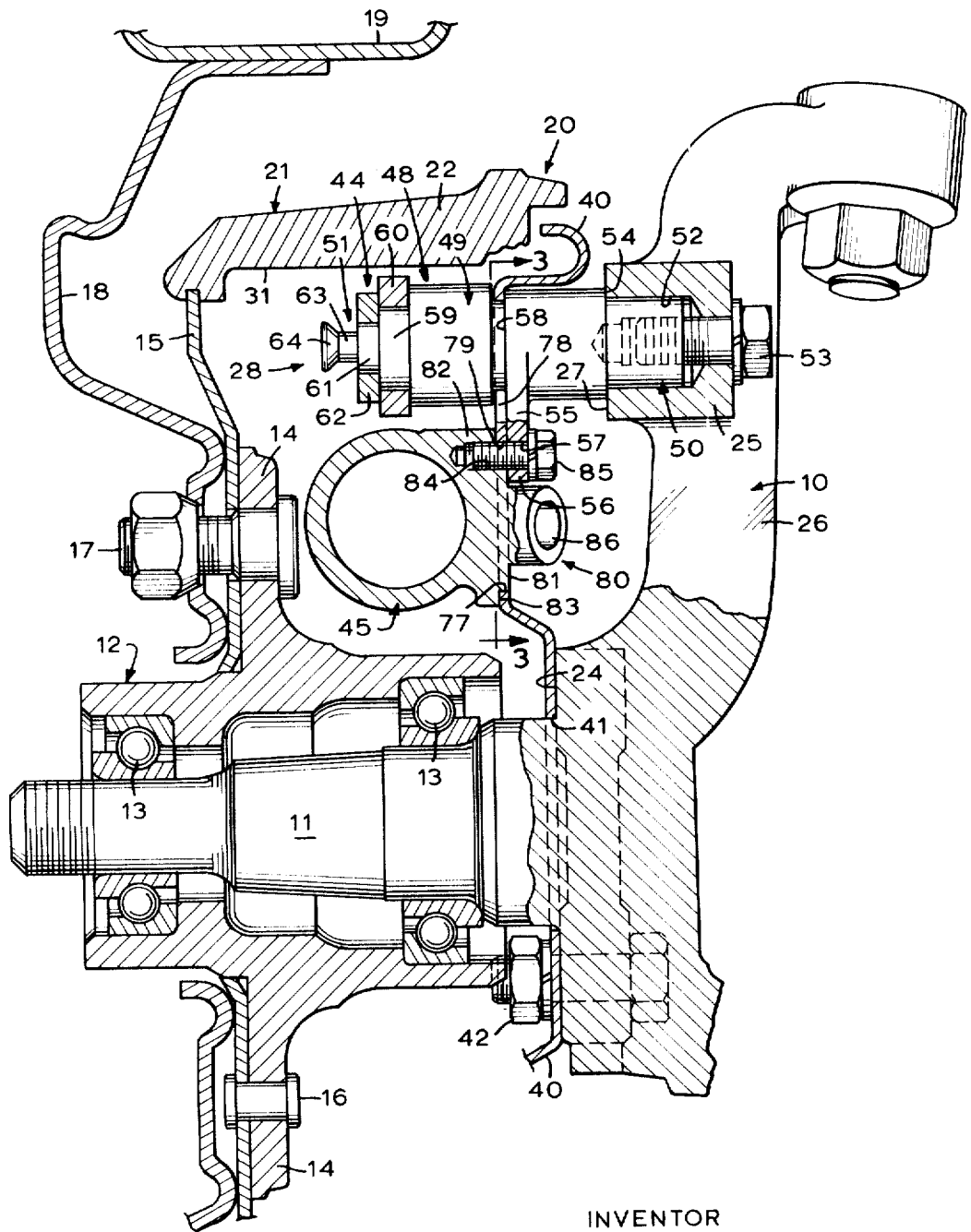

The invention is also embodied in the parts and in the combinations and arrangements of parts hereinafter described and claimed. In the accompanying drawings which form a part of this specification and wherein like numerals refer to like parts wherever they occur:

FIGURE 1 is a vertical elevational view of a brake assembly embodying the invention, the brake drum being shown in cross-section, FIGURE 2 is a cross-sectional view taken substantially along line 2—2 of FIGURE 1, and FIGURE 3 is an enlarged fragmentary view of the mounting opening in the backing plate as taken along line 3—3 of FIGURE 2.

Referring now to the drawings, the conventional steering mechanism of a motor vehicle includes a steering knuckle 10 forming a structural support member carrying an axle spindle 11 projecting horizontally therefrom and rotatably carrying a wheel hub 12 on suitable bearings 13. The wheel hub 12 has a radial hub flange 14 to which a brake drum disk 15 is secured by means of rivets or the like 16. Wheel lugs 17 are also provided on the hub flange 14 to support the wheel disk 18 that carries the wheel rim 19 and the tire (not shown). The friction device 20 includes the brake drum 21 comprising an annular drum ring 22 secured to the outer periphery of the drum disk 15 and, in turn, to the wheel hub 12 for rotation relative to the spindle 11 and the steering knuckle 10.

The steering knuckle 10 is provided with a spindle pad surface 24 disposed about the spindle 11 and, in accordance with the present invention, enlarged pads or embossments 25 are formed on each side of the knuckle shank 26 above the spindle 11 and are provided with knuckle pad surfaces 27.

The friction device 20 also includes a wheel brake sub-assembly 28 including a pair of arcuate brake shoes 29 and 30 positioned within the brake drum 21 and adapted for frictional braking engagement with the inner drum surface 31. Each of the brake shoes 29 and 30 has a web 32 and a table 33 to which a friction lining 34 is secured. An adjustable strut 35 including a star wheel 36 articulates the lower opposed adjacent ends 37 and 38 of the brake shoes 29 and 30, and a coiled spring 39 is connected between the lower ends 37 and 38 of the shoes to maintain contact between the shoes and the adjustable strut and to prevent undesired rotation of the star wheel 36. The wheel brake sub-assembly 28 includes a backing plate 40 having a central opening 41 through which the spindle 11 extends, the backing plate 40 being secured to the spindle pad surface 24 of the steering knuckle 10 by bolts 42 in concentric position with the brake drum 21. The brake shoes 29 and 30 are carried and supported primarily by an anchor pin assembly 44, are actuated by a wheel cylinder 45, and are stabilized and retained in position in the wheel brake- sub-assembly 28 by guide pins 46 and resilient clips 47 adjustably holding the brake shoes 29 and 30 on the backing plate 40.

The anchor pin assembly 44 includes an anchor pin 48, which is generally cylindrical in shape and has a large central or body portion 49, a smaller rear mounting portion or shank 50 and a smaller stepped front portion 51. It will be noted in FIGURE 1 that the wheel brake assembly 28 is rotated approximately 15° from the vertical so that the anchor pin assembly attachment to the steering knuckle 10 will not interfere with the main portion of the knuckle shank 26. The rear portion 50 of the anchor pin is mounted non-rotatively with a snug fit into a bore 52 in one of the embossments 25 of the steering knuckle 10 and is secured therein by a suitable bolt 53, an annular abutment surface 54 between the central and rear portions 49 and 50 being engaged against the knuckle pad surface 27. The central portion 49 has a depending flange 55 including spaced ears 56 with openings 57 to coincide with the mounting openings of the wheel cylinder 45. An annular groove 58 is also formed in the central portion 49 of the anchor pin 48 on one side of the flange 55 to receive and retain the backing plate 40 as will be described more fully hereinafter. The front portion 51 of the anchor pin 48 includes a first reduced cylindrical section 59 adjacent to the central portion for rotatably carrying an anchor block member 60 forming a part of the anchor pin assembly. The front stepped portion 51 also includes a further reduced section 61 on which is mounted a shoe guide 62 having an axial thickness greater than that of its reduced mounting section 61. Extending outwardly beyond the second reduced section 61 is a neck 63 and beveled head 64.

As above stated, the brake shoes 29 and 30 are supported primarily by the anchor pin assembly 44 and are actuated by the wheel cylinder 45. The upper opposed adjacent ends 65 and 66 of the shoes 29 and 30 include notches 67 formed in the webs 32 to receive slotted ends of push rods 68 adapted to be actuated by pistons (not shown) of the wheel cylinder 45. The ends of the shoes are also provided with flat inclined abutment surfaces 69 and 70 in slidable contact with opposed surfaces 71 and 72 of the anchor block member 60, and are normally retained in retracted position thereagainst by return springs 73 connected between the neck 63 of the anchor pin 48 and hooks 74 formed on the tables 33 of the brake shoes 29 and 30.

Referring particularly to FIGURES 2 and 3, it will be seen that the backing plate 40 includes a keyhole shaped opening 76 having enlarged circular lower portion 77 and a narrower radially extending slot portion 78 with bolt mounting apertures 79 being formed in the backing plate 40 integral with the keyhole opening 76 and extending radially from the periphery of the circular portion 77 on each side of the slot portion 78. The wheel cylinder has a rear mounting portion 80 including a substantially circular embossment 81 to coincide with the circular portion 77 of the opening 76. The embossment 81 is offset from the main wheel cylinder body to form an adjacent annular shoulder 83 for abutment with the backing plate 40. The wheel cylinder body also has radial ears 82 each having a threaded opening 84 corresponding to the apertures 79 to receive a bolt 85 for mounting the wheel cylinder 45. The wheel cylinder 45 also has the usual brake line connections 86 and the like.

The anchor pin 48 is assembled with the backing plate 40 by being inserted into the circular lower portion 77 of the opening 76 with the annular groove 58 in registry with the backing plate 40, and the anchor pin 48 is moved upwardly with the annular groove 58 being received into the slot portion 78 and the large central portion 49 of the anchor pin preventing axial displacement of the pin from the backing plate 40. The depending flange 55 of the anchor pin is positioned with the openings 57 in the spaced ears 56 in registry with the bolt mounting aperture 79 in the backing plate. The wheel cylinder 45 is positioned with the embossment 81 in the circular lower portion 77 of the keyhole opening 76 and its shoulder 83 and ears 82 in abutment with the backing plate 40. The bolts 85 are then received in the openings 57 of the anchor pin flange 55 and aligned apertures 79 and threadedly engaged in the openings 84 of the wheel cylinder 45 to rigidly mount the wheel cylinder on the anchor pin 48.

It will thus be seen that the anchor pin assembly 44 and wheel cylinder 45 are mounted in fixed spaced relation by the flange 55 with the backing plate 40 being retained in abutment with the wheel cylinder surface 83 and also positioned in the anchor pin groove 58 between the larger sections of the central portion 49. The ends 37 and 38 of the brake shoes 29 and 30 are jointed by the adjustment strut 35 and spring 39, and the shoes are assembled with the wheel cylinder push rods 68 in the notches 67 and the end surfaces 69 and 70 slidably received on the anchor block 60 and are held in assembled position by the return springs 73. The shoes 29 and 30 are also adjustably positioned on the backing plate 40 by the clips 47 to complete the wheel brake sub-assembly 28.

The sub-assembly 28 facilitates factory assembly, storage and shipment and, in addition, can be readily installed on the steering knuckle 10 as a unit by fitting the shank 50 of the anchor pin 48 directly or non-rotatively into the opening 52 and securing the bolt 53 from the opposite side of the knuckle pad 25. The bolts 42 are also applied to align and support the backing plate 40 on the spindle pad 24.

Although the wheel cylinder 45 does not receive any of the torque of braking, its fixed spaced position relative to the anchor pin assembly 44 is important in the actuation and retraction of the brake shoes 29 and 30. The assembly of the anchor pin 48 and wheel cylinder 45, as defined, not only facilitates manufacture and installation, but permits the wheel cylinder to be disassembled from the brake sub-assembly 28 for service or replacement without requiring the disassembly of the remaining parts of the sub-assembly.

According to the invention, all braking forces are transmitted from the shoes 29 and 30 through the anchor pin assembly 44 directly to the steering knuckle 10, and the backing plate 40 merely functions as a dust shield and as a stabilizer for restraining brake shoe displacement from the sub-assembly 28 during shipment and installation. It will be understood that the sliding engagement of the brake shoe surfaces 69 and 70 with the anchor block member 60 and the yieldable brake shoe connection means, which includes the adjustable strut 35 and spring 39 articulating the lower ends 37 and 38, the resilient clips 47 and the retraction springs 73, together provide a fully floating brake shoe condition permitting the brake shoes 29 and 30 to adjust themselves concentrically with the brake drum 21 whereby the critical machining problems of the prior art for location of the anchor pin with respect to the spindle is obviated.

The invention is intended to include all changes and modifications of the embodiment selected for disclosure that will be readily apparent to those skilled in the art, and the invention is limited only by the scope of the claims which follow.

What I claim is:

1. In a wheel brake mechanism including structural support means, spindle means on said support means rotatably supporting a brake drum thereon, and a brake sub-assembly including a backing plate, brake shoes positioned on said backing plate and adapted for frictional engagement with said brake drum, an anchor pin rigidly secured on said support means and in anchoring engagement with opposed adjacent ends of said brake shoes, wheel cylinder means for actuating said brake shoes into frictional engagement with said brake drum, and flange means on said anchor pin for removably mounting said wheel cylinder means in fixed radially spaced relation with said anchor pin.

2. In a knuckle mounted brake sub-assembly having a backing plate, opposed brake shoe means with torque transmitting ends, actuating means for said brake shoe means, and anchor pin means for engagement by said torque transmitting ends of said brake shoe means; the combination of an opening in said backing plate having radially aligned and interconnecting large and small portions, said anchor pin means having a large central portion sized to be received through said large opening portion and an annular groove in said central portion sized to be received into said small opening portion with said central portion preventing axial displacement of said anchor pin means from said small opening portion, flange means extending from said central portion of said anchor pin means, said actuating means having a mounting portion received in said large opening portion in abutment with said backing plate, and means removably securing said actuating means to said anchor pin flange means for maintaining a predetermined assembled relationship between said anchor pin means, backing plate and actuating means.

3. In a knuckle mounted brake assembly including a steering knuckle carrying a wheel spindle and having a radially spaced spindle and knuckle pad mounting means, a brake drum mounted for concentric rotation on said wheel spindle, and a brake sub-assembly having a backing plate, opposed brake shoe means with torque transmitting ends, actuating means for said brake shoe means, and anchor pin means for engagement by said torque transmitting ends of said brake shoe means; the combination of an opening in said backing plate having radially aligned and interconnecting large and small portions with a predetermined radial dimension thereacross, said anchor pin means having a large central portion sized to be received through said large opening portion and an annular groove in said central portion sized to be received into said small opening portion with said central portion preventing axial displacement of said anchor pin means from said small opening portion, flange means extending from said central portion of said anchor pin means, said actuating means having a mounting portion received in said large opening portion in abutment with said backing plate, means removably securing said actuating means to said anchor pin flange means for maintaining an assembled relationship between said anchor pin means, backing plate and actuating means of said brake sub-assembly, said anchor pin means being adapted to be rigidly secured to said knuckle pad mounting means and said backing plate being adapted to be rigidly secured to said spindle mounting means for securing said brake sub-assembly to said steering knuckle and maintaining the assembled relationship of said anchor pin means and backing plate thereon, and said actuating means being adapted to be disassembled from said flange means and backing plate without removing said anchor pin means and backing plate from said assembled relationship with said steering knuckle.

4. In a knuckle mounted vehicle brake including a steering knuckle carrying a wheel spindle, means for mounting a brake drum on said spindle for rotation relative thereto, an embossment on said support member spaced radially from said spindle, and a brake sub-assembly including a backing plate, articulated brake shoe means adapted for frictional engagement with said brake drum, means yieldably supporting said brake shoe means on said backing plate, wheel cylinder means positioned between the torque transmitting ends of said brake shoe means and being adapted for actuation thereof into frictional engagement with said brake drum, spring means for normally retracting said brake shoe means away from said brake drum, and anchor pin means for engagement by said torque transmitting ends of said brake shoe means in retracted position; the improvement comprising said anchor pin means including a solid anchor pin positioned in an opening in said backing plate and adapted to be secured to said embossment on said steering knuckle, an anchor block rotatably mounted on said anchor pin and being slidably contacted on opposite sides by said torque transmitting ends of said brake shoe means in retracted position and at least one side of said anchor block remaining in contact with one of said brake shoe ends during brake actuation for transmitting brake torque directly through said solid anchor pin to said support member, said slidable contact between said brake shoe ends and said rotatable anchor block providing for self-centering of said brake shoe means in a concentric position within said brake drum, and means for removably mounting said wheel cylinder means in fixed spaced relation with said anchor pin means.

5. A friction device sub-assembly comprising support means, friction means movably mounted on said support means, anchor means assembled on said support means and adapted for anchoring engagement by said friction means, actuator means for said friction means removably engaged with said support means in fixed spaced relation with said anchor means, said anchor means including means extending therefrom toward said actuator means, and removable means secured between said included means and actuator means to maintain said actuator means in engagement with said support means in fixed spaced relation with said anchor means.

6. A friction device sub-assembly comprising support means having opposed sides, friction means movably mounted on one side of said support means, anchor means extending through said support means between the opposed sides thereof and adapted for anchoring engagement with said friction means, actuator means for said friction means and adapted for removable mounting engagement with said support means on the one side thereof and predeterminately spaced from said anchor means, said anchor means including flange means extending therefrom toward said actuator means adjacent to the other side of said support means, and other means extending through said support means between the opposed sides thereof and removably secured with each of said actuator means and flange means to maintain said actuator mens in removable mounting engagement with said support means and predeterminately spaced from said anchor means.

7. A friction device sub-assembly for mounting engagement with a vehicle steering knuckle comprising anchor pin means adapted to be rigidly secured on said steering knuckle, a backing plate adapted to be rigidly secured on said steering knuckle, said anchor pin means being assembled on said backing plate for displacement preventing engagement therewith, actuating means radially disposed on said backing plate with respect to said anchor pin means and spaced therefrom, flange means extending from said anchor pin means toward said actuating means, and other means extending through said backing plate for removably mounting said actuating means to said flange means to maintain a predetermined assembled relationship between said anchor pin means, backing plate and actuating means.

8. A friction device comprising support means, friction means movably supported on said support means, a pair of interconnecting openings in said support means, anchor means for said friction means received through one of said openings including means received in registry with the other of said openings to prevent displacement of said anchor means from said support means through said other opening, flange means on said anchor means and extending therefrom, actuator means for said friction means including other means sized to be received in said one opening, and removably secured means connected between said actuator means and flange means to prevent the displacement of said anchor means toward said one opening and the displacement of said other means from said one opening.

9. A friction device comprising a pair of support members, friction means movably supported on one of said support members, a pair of interconnected aperture means in said one support member, the other of said support members having a portion sized to be received through one of said aperture means, groove means in said portion sized to be received into the other of said aperture means with said portion preventing displacement of said other support member through said other aperture means, flange means extending from said other support member toward said other aperture means, actuator means for said friction means and spaced from said other support member and including means sized to be received into said one aperture means, and other means removably securing said actuator means to said flange means to prevent displacement of said other support member from said other aperture means toward said one aperture means and to prevent displacement of said included means from said one aperture means.

10. A friction device comprising a support member having opposed sides, friction means movably supported on one side of said support member, aperture means extending through said support member between said opposed sides including a slot portion and an enlarged portion connected therewith, anchor means for said friction means axially received through said enlarged portion, groove means in said anchor means and movable radially into registry with said slot portion including opposed side walls for respective engagement with the opposed sides of said support member adjacent to said slot means to prevent axial displacement of said anchor means through said slot means, actuator means for said friction means on said one side of said support member in radially spaced relation with said anchor means, mounting means on said actuator means axially received into said enlarged portion in radial displacement preventing engagement therewith, flange means on said anchor means extending toward said enlarged portion adjacent the other side of said support member, and means for removably securing said actuator means with said flange means in fixed radially spaced relation with said anchor means to prevent radial displacement of said groove means into said enlarged portion and to prevent axial displacement of said mounting means from said enlarged portion.

References Cited by the Examiner
UNITED STATES PATENTS

| | | | |
|---|---|---|---|
| 2,057,723 | 10/1936 | La Brie | 188—152 |
| 2,372,415 | 3/1945 | Eksergian | 188—152 |
| 2,885,035 | 5/1959 | Rubly | 188—206 |
| 2,902,188 | 9/1959 | Parker | 188—78 |
| 3,016,112 | 1/1962 | Helvern | 188—78 |
| 3,177,979 | 4/1965 | Powlas | 188—78 |

DUANE A. REGER, *Primary Examiner.*